(12) United States Patent
Sun

(10) Patent No.: US 9,739,977 B2
(45) Date of Patent: Aug. 22, 2017

(54) LENS ASSEMBLY FOR PORTABLE DEVICES

(71) Applicant: Vista Optronics, Inc., Xiamen (CN)

(72) Inventor: Fengqing Sun, Austin, TX (US)

(73) Assignee: Vista Optronics, Inc., Xiamen (CN)

( * ) Notice: Subject to any disclaimer, the term of this patent is extended or adjusted under 35 U.S.C. 154(b) by 33 days.

(21) Appl. No.: 14/991,624

(22) Filed: Jan. 8, 2016

(65) Prior Publication Data
US 2017/0075088 A1    Mar. 16, 2017

(30) Foreign Application Priority Data

Sep. 11, 2015   (CN) .......................... 2015 1 05776973

(51) Int. Cl.
| | |
|---|---|
| G02B 3/02 | (2006.01) |
| G02B 13/00 | (2006.01) |
| G02B 1/04 | (2006.01) |
| G02B 5/20 | (2006.01) |
| G02B 9/50 | (2006.01) |
| G02B 9/56 | (2006.01) |

(52) U.S. Cl.
CPC .......... *G02B 13/004* (2013.01); *G02B 1/041* (2013.01); *G02B 5/208* (2013.01); *G02B 9/50* (2013.01); *G02B 9/56* (2013.01)

(58) Field of Classification Search
CPC .................................................... G02B 13/004
USPC ........................................................ 359/715
See application file for complete search history.

(56) References Cited

U.S. PATENT DOCUMENTS

| 7,274,518 B1 | 9/2007 | Tang et al. | |
|---|---|---|---|
| 2012/0293875 A1* | 11/2012 | Tsai ......................... | G02B 9/34 359/715 |
| 2015/0098009 A1 | 4/2015 | Hsieh | |

* cited by examiner

*Primary Examiner* — James Jones
(74) *Attorney, Agent, or Firm* — Treasure IP Group, LLC

(57) ABSTRACT

A lens assembly for portable devices comprises: an aperture stop, a plastic first lens element with positive refractive power having a convex object-side surface; a plastic second lens element with negative refractive power having a concave image-side surface and an object-side surface being concave in a peripheral region; a plastic third lens element with negative refractive power having a concave object-side surface and a convex image-side surface; a plastic fourth lens element with positive refractive power having an image-side surface being concave in a paraxial region and convex in a peripheral region; and an IR-cut filter (infrared-cut filter); wherein the $RI_{min}$ represents the minimum RI (relative illumination) of effective field and it satisfies the following relation: $0.36 < RI_{min} < 0.65$.

8 Claims, 10 Drawing Sheets

LENS ASSEMBLY FOR PORTABLE DEVICES

CROSS REFERENCE TO RELATED APPLICATION

This application claims priority to a Chinese Application No. 2015105776973, filed on Sep. 11, 2015. The Chinese Application is incorporated herein by reference in its entirety.

BACKGROUND OF THE INVENTION

Field of the Invention
The present invention relates to an optical lens assembly and more particularly to a lens assembly for portable devices
Description of the Prior Art
In recent years, the development of the optical lens assembly in digital cameras, web cameras and portable phone cameras becomes more rapid with the sharp increase in demand of people for high image capturing quality. High resolution, large field of view for sub camera, smaller size and etc are all considered more and more by consumers Generally, a 5 mega-pixel lens assembly is used to be a three-lens structure. And now in order to obtain an 8 mega-pixel lens assembly we usually start project with choosing a four-lens structure, which could maintain a high yield of lens assembly when trying to pursue good imaging quality. For evaluating imaging quality, relative illumination (RI) is one of the key parameters we should take in consideration since it can indicate the imaging uniformity. And in practice, solutions like reducing density of off-axis rays, shrinking vignetting may be done to refine RI performance. These solutions could be conducted by adjusting aspheric coefficients of the lens.

How to achieve good imaging uniformity, and balance the weight between high imaging quality and manufacturing feasibility is the key topics in lens assembly fabrication, therefore, there is need to construct a favorable lens assembly structure with a good adjustment of its structure and aspheric coefficients.

A U.S. Pat. No. 7,274,518B1 discloses a lens assembly, which comprises four-lens elements and an aperture stop located between the object-side of the optical system and the second lens element for controlling the brightness of the optical system. This invention provided a method of optical system with less glass, more plastic non-spherical lens to obtain a compact system. But the invention is not conducted through adjusting relationships between aspheric coefficients to gain a better RI performance.

SUMMARY OF THE INVENTION

The present invention provides a four-element lens assembly. With controlling the refractive power and key relationship between each aspheric coefficient, a good relative illumination will be achieved while keep a high image quality of the lens assembly.

According to one disclosure of the present invention, an lens assembly includes, in order from an object-side to an image-side, an aperture stop, a plastic first lens element with positive refractive power having a convex object-side surface; a plastic second lens element with negative refractive power having a concave image-side surface and an object-side surface being concave in a peripheral region; a plastic third lens element with negative refractive power having a concave object-side surface and a convex image-side surface; a plastic fourth lens element with positive refractive power having an image-side surface being concave in a paraxial region and convex in a peripheral region; and an IR-cut filter (infrared-cut filter).

In one lens assembly of the present disclosure, the lens assembly satisfies:

$0.36 \leq RI_{min} \leq 0.65.$ $-0.299 \leq AC3 \leq 0.653.$ $0.101 \leq AC4 \leq 0.182.$ $-1.855 \leq ASUM \leq -0.558.$ wherein $RI_{min}$ represents the minimum relative illumination of effective field and its maximum value in theory is 1, AC3 represents the total aspheric coefficients of said object-side surface in 2nd lens element, AC4 represents the total aspheric coefficients of said image-side surface in 2nd lens element, ASUM represents the total aspheric coefficients of all surfaces in said lens assembly.

Parameters for non-spherical surfaces are basically defined by, but not limited to, the following aspheric surface profiles equation:

$$X(Y) = \frac{(Y^2/R)}{\left(\sqrt{1-(1+k)\frac{Y^2}{R^2}}\right)} + \sum_i Ai * Y^i$$

Wherein X is the relative distance between a point on the aspheric surface at a distance Y from the optical axis and the tangential plane at the aspheric surface vertex, Y is the distance from the point on the curve of the aspheric surface to the optical axis, R represents the curvature radius of the surface, k represents a conic factor and Ai represents an $i^{th}$-order aspheric coefficient of one lens surface. In the embodiments, i may be but not limited to 2, 4, 6, 8, 10, 12, 14, 16, and 18.

DETAILED DESCRIPTION OF THE PREFERRED EMBODIMENTS

Figure 1:
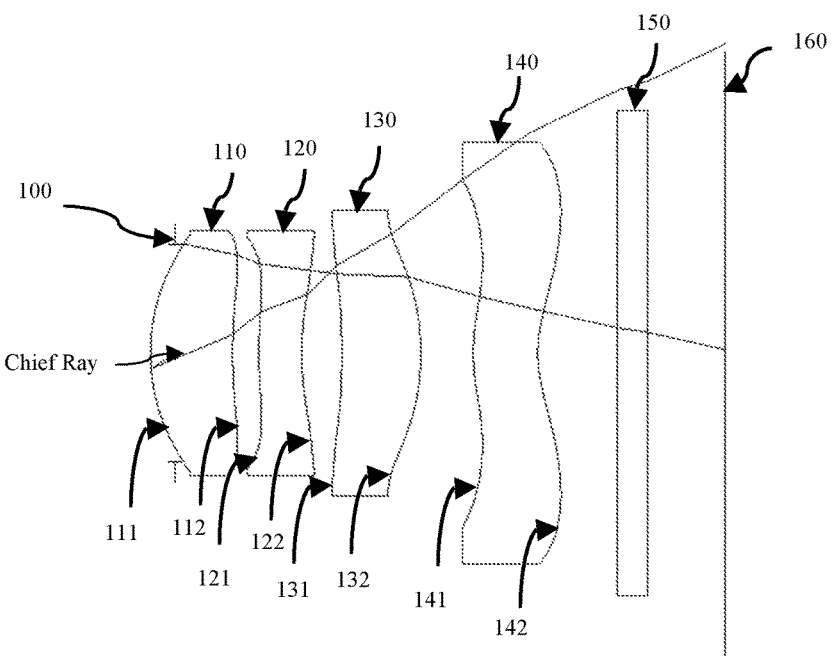
FIG. 1 shows a lens assembly in accordance with a first embodiment for the disclosure.

The lens assembly of the present disclosure is described in greater detail with illustrating embodiments thereof.

In one present disclosure, the optical system with an lens assembly, sequentially arranged from an object-side to an image-side along an optical axis, comprises an aperture stop, a first lens element, a second lens element, a third lens element, a fourth lens element and an IR-cut filter (infrared-cut filter) and an image plane. The first lens element with positive refractive power having a convex object-side surface is made of plastic which cooperating with an aperture stop deposed ahead can control the total light rays passing through the system and reduce the vignetting. The second lens element made of plastic with negative refractive power having a concave image-side surface and an object-side surface being concave in a peripheral region, which can balance the refractive power of the whole system and help to reduce the field curvature. The plastic third lens element with negative refractive power has a concave object-side surface and a convex image-side surface, which can modify the sensitivity of the system and readjust the principal point. The plastic fourth lens element with positive refractive power has an image-side surface being concave in a paraxial region and convex in a peripheral region, which provides better modification on spherical aberration of the system and refine the field of curve performance. An IR-cut filter is applied here to prevent infrared light from being absorbed by the sensor, which is able to maintain a steady image quality.

In the aforementioned disclosure of lens assembly, TTL is the total track length and BFL is the back focal length, R5 is the curvature radius of the object-side surface of said third lens element and R6 is the curvature radius of the image-side surface of said third lens element, T represents the total center thickness of four lens elements, AT represents the total center air thickness counted from the first lens element to the IR-cut filter, HFOV represents the half field of view of said lens assembly.

When $0.36 < RI_{min} < 0.65$ is satisfied, the image will be more uniform and favorable for human eyes. Meanwhile, manufacturing of lens assembly can be easier.

The lens assembly satisfies: HFOV≥33.67° so that effective field of view will be extended.

The relation that R5/R6≥2.47 is preferred for extending in back focal length.

When T/AT≥2.35 is satisfied, it will be favorable to modified field of curve and fewer manufacturing difficulties will be encountered during the lens production process.

When the relation −0.299≤AC3≤0.653 is satisfied, higher resolution ability of the module can be guaranteed and also the distortion and astigmatism can be effectively reduced When the relation 0.101≤AC4≤0.182 is satisfied, the spherical aberration and coma caused by off-axis rays can be modified.

The relation −1.855≤ASUM≤−0.558 prevent the high order spherical aberration from becoming too large.

If the relation 6.62≤TTL/BFL≤8.21 satisfied, there will be more sufficient space to accommodate other components in the lens assembly.

Here, items like spherical aberration, field curvature and distortion were used to evaluate imaging quality, and for example, the value of distortion should be under 3%; the smaller the distances between three lines are in the longitudinal aberration, the better the chromatic property is. Also, smaller space between S and T curves will be better. In each aberration Figure, the Y-axis is the field of view counted from 0 to 1 field. If we select appropriate aspheric coefficients of lens surface, a good relative illumination value over 36% under any field can be achieved.

Referring to FIG. 1 for the second embodiment of the present invention, the lens assembly sequentially arranged from an object-side to an image-side along the optical axis, comprises an aperture stop 100, a first lens element 110, a second lens element 120, a third lens element 130, a fourth lens element 140, an IR-cut filter 150 and an image plane 160, wherein all the lens elements 110, 120, 130 and 140 are made of plastic.

The first lens element 110 with positive refractive power has a convex image-side surface 111 and an image-side surface 112;

The second lens element 120 with negative refractive power has a concave image-side surface 122 and an object-side surface being concave in a peripheral region;

The third lens element 130 with negative refractive power has a concave object-side surface 131 and a convex image-side surface 132;

The fourth lens element 140 with positive refractive power has an object-side surface 141, which contains multiple inflection points in a paraxial region, and a convex image-side surface 142 being concave in a paraxial region and convex in a peripheral region.

Figure 2:
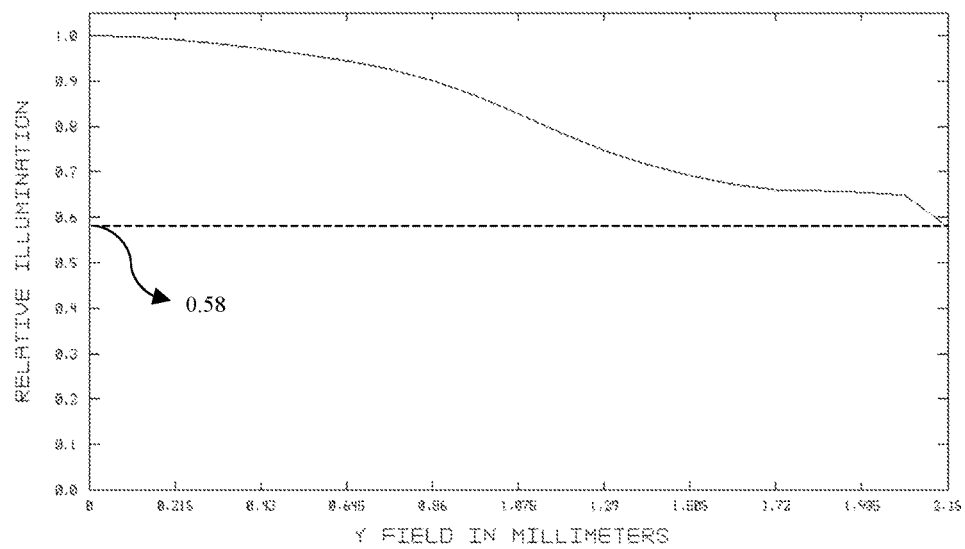
FIG. 2 shows the RI curve of the first embodiment for the disclosure.
Figure 3:
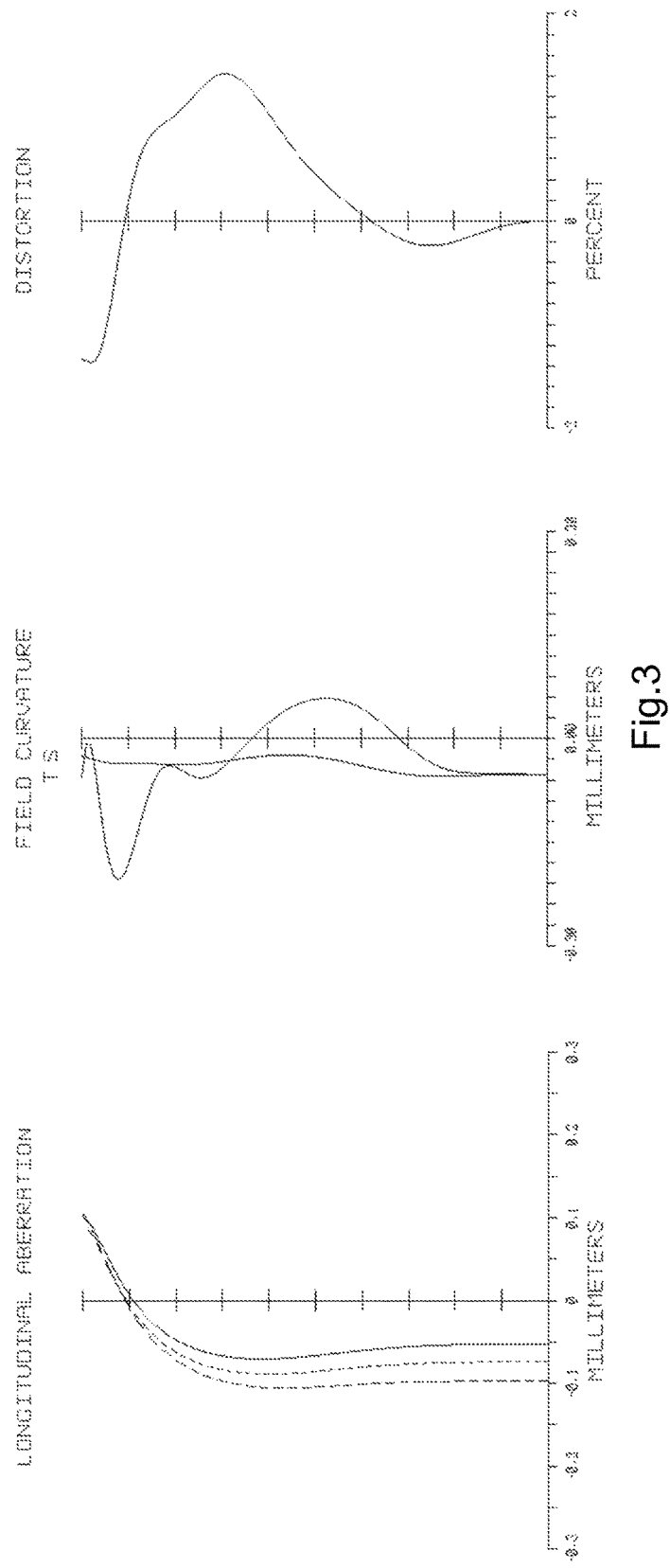
FIG. 3 shows the aberration curves of the first embodiment for the disclosure.

What is revealed in FIG. 2 is the relative illumination status of the fourth embodiment wherein the Y axis is the value of relative illumination and the X axis is the image heights corresponding to fields counted from 0 to 1 field. It can be seen a decreased relative illumination curve in FIG. 2. We pick up the lowest point of the relative illumination curve as the minimum illumination value $RI_{min}$. In this embodiment, $RI_{min}$ is 0.58 at the maximum image height which means the system has excellent imaging illumination uniformity.

The detailed information of lens assembly in the first embodiment is shown in TABLE 1-1 and 1-2 below.

TABLE 1-1

Embodiment 1
f = 3.21, F# = 2.05, HFOV = 33.67°,

| Surface No. | Curvature radius (mm) | Thickness (mm) | Refractive Index (Nd) | Dispersion coefficient (Vd) |
|---|---|---|---|---|
| Aperture stop | ~ | ~ | −0.170 | | |
| First lens element | 111 | 1.34 | 0.569 | 1.544 | 55.9 |
| | 112 | 3.16 | 0.183 | | |
| Second lens element | 121 | 2.83 | 0.296 | 1.636 | 23.3 |
| | 122 | 1.88 | 0.279 | | |
| Third lens element | 131 | −5.07 | 0.546 | 1.636 | 23.3 |
| | 132 | −1.93 | 0.363 | | |
| Fourth lens element | 141 | 1.25 | 0.449 | 1.544 | 55.9 |
| | 142 | 0.94 | 0.551 | | |
| IR-cut filter | 151 | ~ | 0.21 | 1.517 | 64.2 |
| | 152 | ~ | 0.538 | | |
| Image plane | 160 | ~ | ~ | ~ | ~ |

In TABLE 1-1, f represents the effect focal length, F# represents the F number and HFOV represents the half field of view of the system in disclosed embodiment. The aspheric coefficients of each surface satisfy the aspheric surface profiles equation and are referred in TABLE 1-2 below where A4 to A18 represent the $4^{th}$ to $18^{th}$-order aspheric coefficient respectively and k is conic index in the aspheric surface profiles equation. All labels for TABLE of the remaining embodiments share the same definitions as those in TABLE 1-1 and TABLE 1-2 in the first embodiment, and their definitions will not be stated again.

TABLE 1-2

Aspheric Coefficients

| Sur. No. | 111 | 112 | 121 | 122 |
|---|---|---|---|---|
| k | 0 | −11.2 | −49.01 | −26.5 |
| A4 | 2.137E−01 | −8.111E−02 | −4.918E−02 | 2.282E−01 |
| A6 | −1.638E−01 | −4.465E−02 | −1.042E+00 | −1.344E+00 |
| A8 | 5.402E−01 | −3.372E−01 | 2.352E+00 | 3.372E+00 |
| A10 | −2.006E+00 | 4.855E−01 | −5.792E+00 | −6.213E+00 |
| A12 | 4.516E+00 | −7.704E−01 | 8.295E+00 | 8.166E+00 |
| A14 | −5.288E+00 | 3.653E−01 | −5.262E+00 | −6.437E+00 |
| A16 | 2.285E+00 | 2.097E−02 | 1.197E+00 | 2.328E+00 |
| A18 | 0.000E+00 | 0.000E+00 | 0.000E+00 | 0.000E+00 |

| Sur. No. | 131 | 132 | 141 | 142 |
|---|---|---|---|---|
| k | 27.28 | −49.80 | 5.52 | −1.08 |
| A4 | 8.788E−02 | −1.103E+00 | −4.352E−01 | −8.044E−01 |
| A6 | 4.753E−01 | 3.877E+00 | −6.282E−01 | 7.293E−01 |
| A8 | −1.288E+00 | −1.114E+01 | 3.382E+00 | −2.532E−01 |
| A10 | 2.596E+00 | 2.467E+01 | −5.711E+00 | −1.509E−01 |
| A12 | −5.363E−01 | −3.872E+01 | 4.898E+00 | 1.377E−01 |
| A14 | −6.974E+00 | 4.150E+01 | −2.065E+00 | 7.191E−03 |
| A16 | 1.255E+01 | −2.829E+01 | 2.064E−01 | −4.040E−02 |
| A18 | −9.294E+00 | 1.087E+01 | 1.316E−01 | 1.514E−02 |

Figure 4:
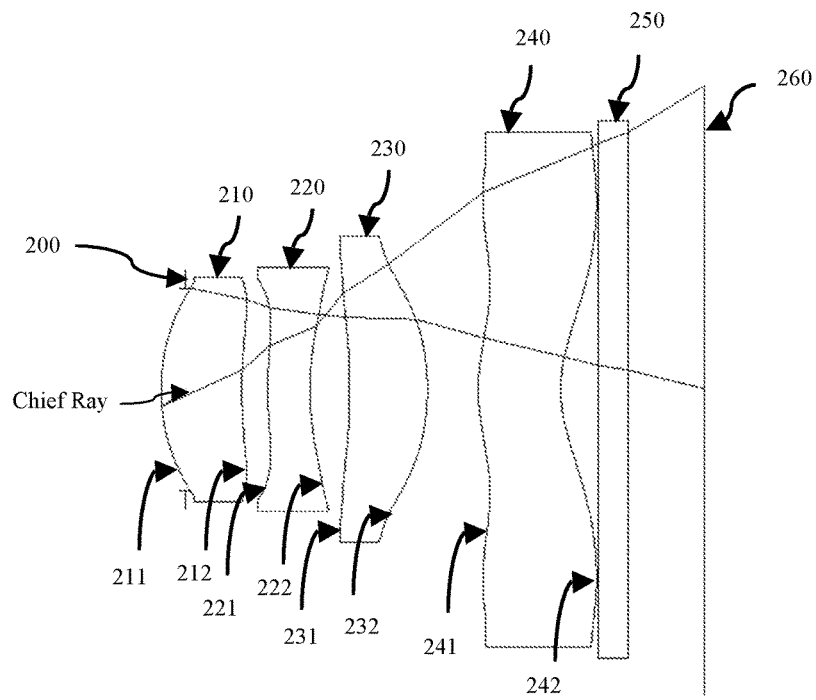
FIG. 4 shows a lens assembly in accordance with a second embodiment for the disclosure.

Referring to FIG. 4 for the second embodiment of the present invention, the lens assembly sequentially arranged from an object-side to an image-side along the optical axis, comprises an aperture stop 200, a first lens element 210, a second lens element 220, a third lens element 230, a fourth lens element 240, an IR-cut filter 250 and an image plane 260, wherein all the lens elements 210, 220, 230 and 240 are made of plastic.

The first lens element 210 with positive refractive power has a convex image-side surface 211 and an image-side surface 212;

The second lens element 220 with negative refractive power has a concave image-side surface 222 and an object-side surface being concave in a peripheral region;

The third lens element 230 with negative refractive power has a concave object-side surface 231 and a convex image-side surface 232;

The fourth lens element 240 with positive refractive power has an object-side surface 241, which contains multiple inflection points in a paraxial region, and a convex image-side surface 242 being concave in a paraxial region and convex in a peripheral region.

Figure 5:
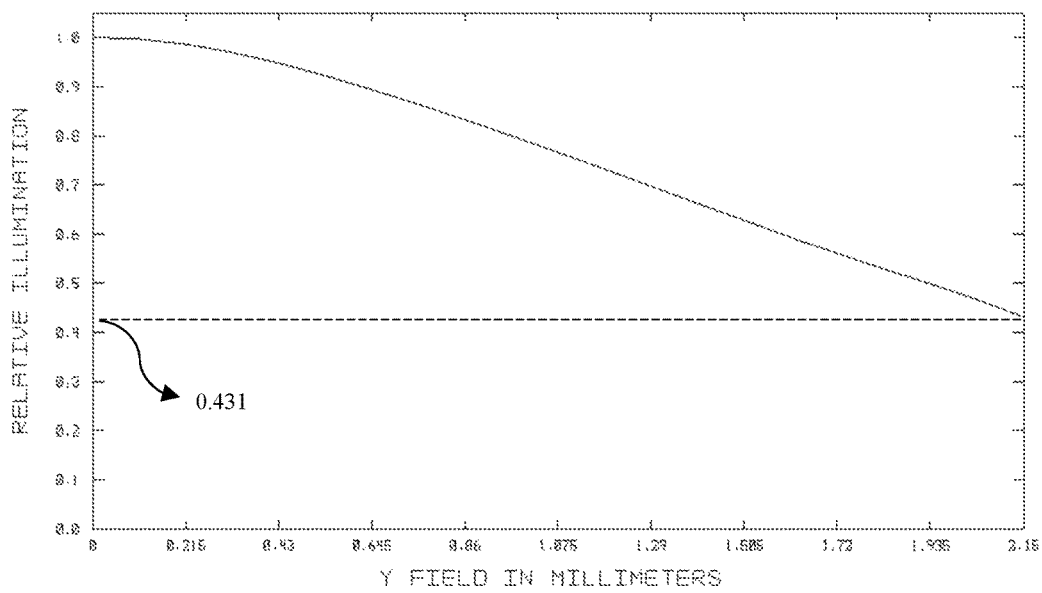
FIG. 5 shows the RI curve of the second embodiment for the disclosure.
Figure 6:
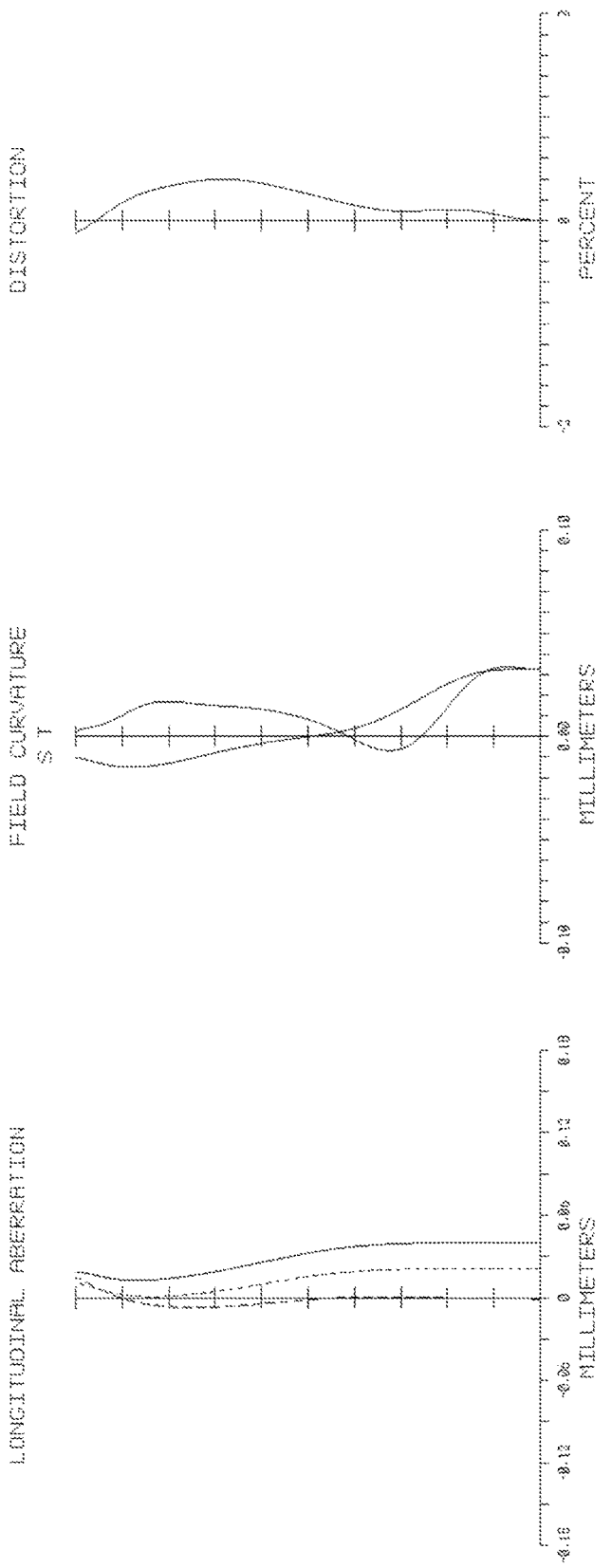
FIG. 6 shows the aberration curves of the second embodiment for the disclosure.

What is revealed in FIG. 5 is the relative illumination status of the fourth embodiment wherein the Y axis is the value of relative illumination and the X axis is the image heights corresponding to fields counted from 0 to 1 field. It can be seen a decreased relative illumination curve in FIG. 5. We pick up the lowest point of the relative illumination curve as the minimum illumination value $RI_{min}$. In this embodiment, $RI_{min}$ is 0.431 at the maximum image height which means the system has regular imaging illumination uniformity.

The detailed information of lens assembly in the second embodiment is shown in TABLE 2-1 and 2-2 below.

TABLE 2-1

Embodiment 2
f = 3.03, F# = 2.05, HFOV = 35.88°,

| | Surface No. | Curvature radius (mm) | Thickness (mm) | Refractive Index (Nd) | Dispersion coefficient (Vd) |
|---|---|---|---|---|---|
| Aperture stop | ~ | ~ | −0.170 | | |
| First lens element | 211 | 1.33 | 0.569 | 1.544 | 55.9 |
| | 212 | 3.17 | 0.183 | | |
| Second lens element | 221 | 2.87 | 0.296 | 1.636 | 23.3 |
| | 222 | 1.92 | 0.28 | | |
| Third lens element | 231 | −5.06 | 0.546 | 1.636 | 23.3 |
| | 232 | −2.04 | 0.363 | | |
| Fourth lens element | 241 | 1.26 | 0.58 | 1.544 | 55.9 |
| | 242 | 0.956 | 0.267 | | |
| IR-cut filter | 251 | ~ | 0.21 | 1.517 | 64.2 |
| | 252 | ~ | 0.538 | | |
| Image plane | 260 | ~ | ~ | ~ | ~ |

TABLE 2-2

Aspheric Coefficients

| Sur. No. | 211 | 212 | 221 | 222 |
|---|---|---|---|---|
| k | −0.125 | −11.2 | −49.01 | −26.5 |
| A4 | 2.169E−01 | −1.016E−01 | −7.017E−02 | 3.096E−01 |
| A6 | −1.638E−01 | −4.465E−02 | −1.034E+00 | −1.344E+00 |
| A8 | 5.402E−01 | −3.372E−01 | 2.352E+00 | 3.372E+00 |
| A10 | −2.006E+00 | 4.855E−01 | −5.792E+00 | −6.213E+00 |
| A12 | 4.516E+00 | −7.704E−01 | 8.320E+00 | 8.166E+00 |
| A14 | −5.288E+00 | 3.653E−01 | −5.262E+00 | −6.437E+00 |
| A16 | 2.285E+00 | 2.097E−02 | 1.197E+00 | 2.328E+00 |
| A18 | 0.000E+00 | 0.000E+00 | 0.000E+00 | 0.000E+00 |

| Sur. No. | 231 | 232 | 241 | 242 |
|---|---|---|---|---|
| k | 27.28 | −49.80 | 5.52 | −1.08 |
| A4 | −7.446E−02 | −1.194E+00 | −4.291E−01 | −5.575E−01 |
| A6 | 4.753E−01 | 3.877E+00 | 3.191E−01 | 4.872E−01 |
| A8 | −1.288E+00 | −1.114E+01 | −1.180E−01 | −3.373E−01 |
| A10 | 2.596E+00 | 2.467E+01 | 2.617E−02 | 1.722E−01 |
| A12 | −5.363E−01 | −3.872E+01 | −3.598E−03 | −6.170E−02 |
| A14 | −6.974E+00 | 4.150E+01 | 3.053E−04 | 1.488E−02 |
| A16 | 1.255E+01 | −2.829E+01 | −1.552E−05 | −2.279E−03 |
| A18 | −9.294E+00 | 1.087E+01 | 4.328E−07 | 1.992E−04 |

Figure 7:
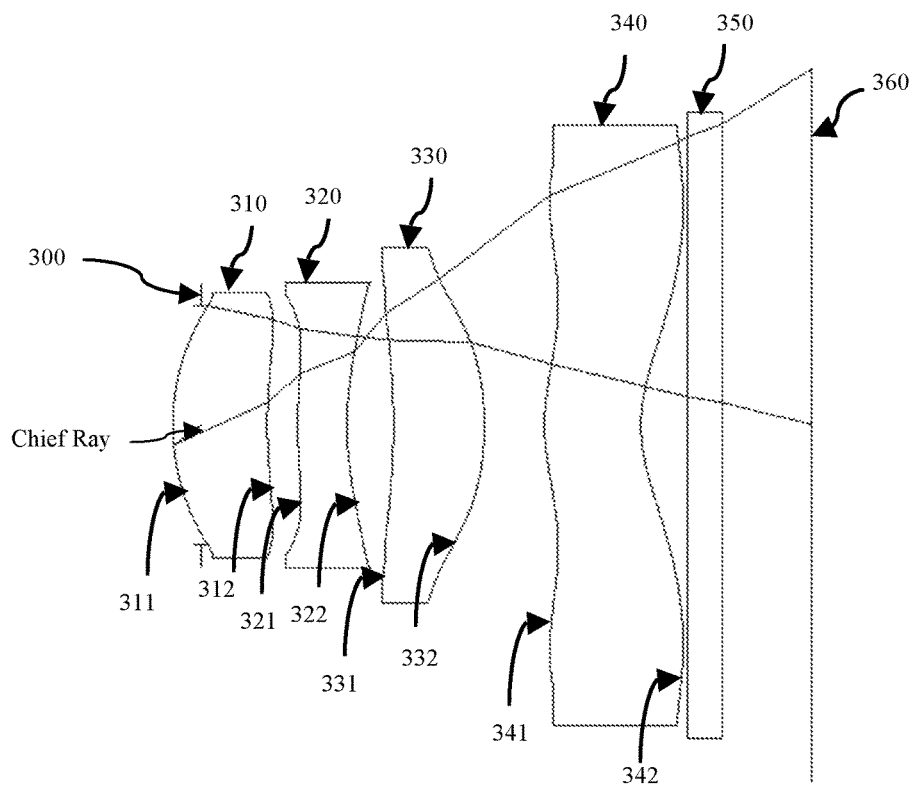
FIG. 7 shows a lens assembly in accordance with a third embodiment for the disclosure.

Referring to FIG. 7 for the third embodiment of the present invention, the lens assembly sequentially arranged from an object-side to an image-side along the optical axis, comprises an aperture stop 300, a first lens element 310, a second lens element 320, a third lens element 330, a fourth lens element 340, an IR-cut filter 350 and an image plane 360, wherein all the lens elements 310, 320, 330 and 340 are made of plastic.

The first lens element 310 with positive refractive power has a convex image-side surface 311 and an image-side surface 312;

The second lens element 320 with negative refractive power has a concave image-side surface 322 and an object-side surface being concave in a peripheral region;

The third lens element 330 with negative refractive power has a concave object-side surface 331 and a convex image-side surface 332;

The fourth lens element 340 with positive refractive power has an object-side surface 341, which contains multiple inflection points in a paraxial region and a convex image-side surface 342 being concave in a paraxial region and convex in a peripheral region.

Figure 8:
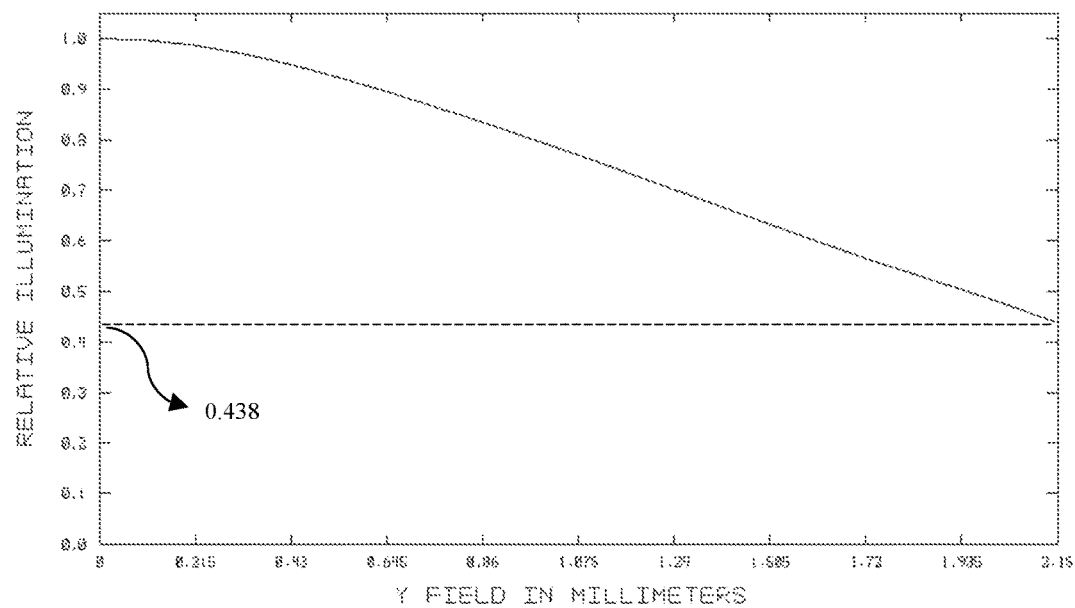
FIG. 8 shows the RI curve of the third embodiment for the disclosure.
Figure 9:
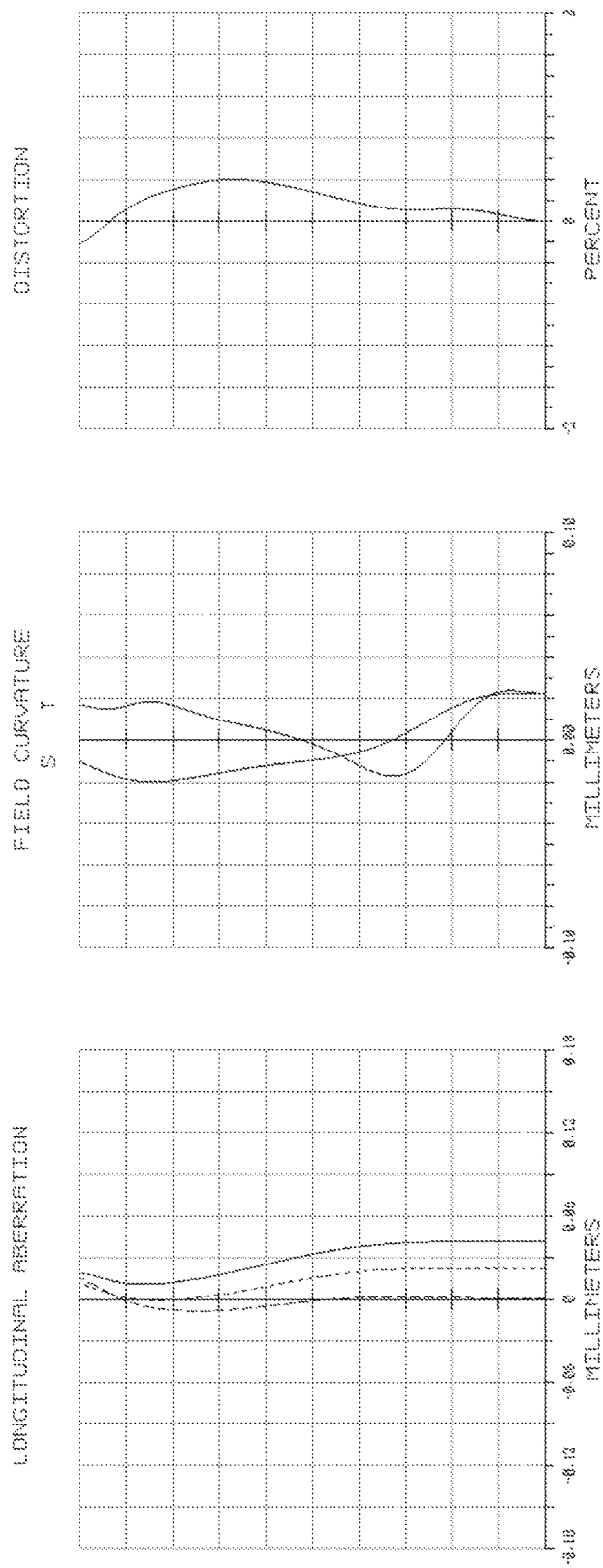
FIG. 9 shows the aberration curves of the third embodiment for the disclosure.

What is revealed in FIG. 8 is the relative illumination status of the fourth embodiment wherein the Y axis is the value of relative illumination and the X axis is the image heights corresponding to fields counted from 0 to 1 field. It can be seen a decreased relative illumination curve in FIG. 8. We pick up the lowest point of the relative illumination curve as the minimum illumination value $RI_{min}$. In this embodiment, $RI_{min}$ is 0.438 at the maximum image height, which means the system has regular imaging illumination uniformity.

The detailed information of lens assembly in the third embodiment is shown in TABLE 3-1 and 3-2 below.

TABLE 3-1

Embodiment 3
f = 3.05, F# = 2.05, HFOV = 35.76°,

| Surface No. | Curvature radius (mm) | Thickness (mm) | Refractive Index (Nd) | Dispersion coefficient (Vd) |
|---|---|---|---|---|
| Aperture stop | ~ | ~ | -0.170 | |
| First lens element | 311 | 1.33 | 0.569 | 1.544 | 55.9 |
| | 312 | 3.17 | 0.183 | | |
| Second lens element | 321 | 2.87 | 0.296 | 1.636 | 23.3 |
| | 322 | 1.92 | 0.28 | | |
| Third lens element | 331 | -5.06 | 0.546 | 1.636 | 23.3 |
| | 332 | -2.04 | 0.363 | | |
| Fourth lens element | 341 | 1.26 | 0.58 | 1.544 | 55.9 |
| | 342 | 0.956 | 0.267 | | |
| IR-cut filter | 351 | ~ | 0.21 | 1.517 | 64.2 |
| | 352 | ~ | 0.538 | | |
| Image plane | 360 | ~ | ~ | ~ | ~ |

TABLE 3-2

Aspheric Coefficients

| Sur. No. | 311 | 312 | 321 | 322 |
|---|---|---|---|---|
| k | -4.125 | -11.2 | -49.01 | -26.5 |
| A4 | 2.169E-01 | -1.016E-01 | -7.017E-02 | 3.096E-01 |
| A6 | -1.638E-01 | -4.465E-02 | -1.034E+00 | -1.344E+00 |
| A8 | 5.402E-01 | -3.372E-01 | 2.352E+00 | 3.372E+00 |
| A10 | -2.006E+00 | 4.855E-01 | -5.792E+00 | -6.213E+00 |
| A12 | 4.516E+00 | -7.704E-01 | 8.320E+00 | 8.166E+00 |
| A14 | -5.288E+00 | 3.653E-01 | -5.262E+00 | -6.437E+00 |
| A16 | 2.285E+00 | 2.097E-02 | 1.197E+00 | 2.328E+00 |
| A18 | 0.000E+00 | 0.000E+00 | 0.000E+00 | 0.000E+00 |

| Sur. No. | 331 | 332 | 341 | 342 |
|---|---|---|---|---|
| k | 27.28 | -49.80 | 5.52 | -1.08 |
| A4 | -7.446E-02 | -1.194E+00 | -4.291E-01 | -5.575E-01 |
| A6 | 4.753E-01 | 3.877E+00 | 3.191E-01 | 4.872E-01 |
| A8 | -1.288E+00 | -1.114E+01 | -1.180E-01 | -3.373E-01 |
| A10 | 2.596E+00 | 2.467E+01 | 2.617E-02 | 1.722E-01 |
| A12 | -5.363E-01 | -3.872E+01 | -3.598E-03 | -6.170E-02 |
| A14 | -6.974E+00 | 4.150E+01 | 3.053E-04 | 1.488E-02 |
| A16 | 1.255E+01 | -2.829E+01 | -1.552E-05 | -2.279E-03 |
| A18 | -9.294E+00 | 1.087E+01 | 4.328E-07 | 1.992E-04 |

Figure 10:
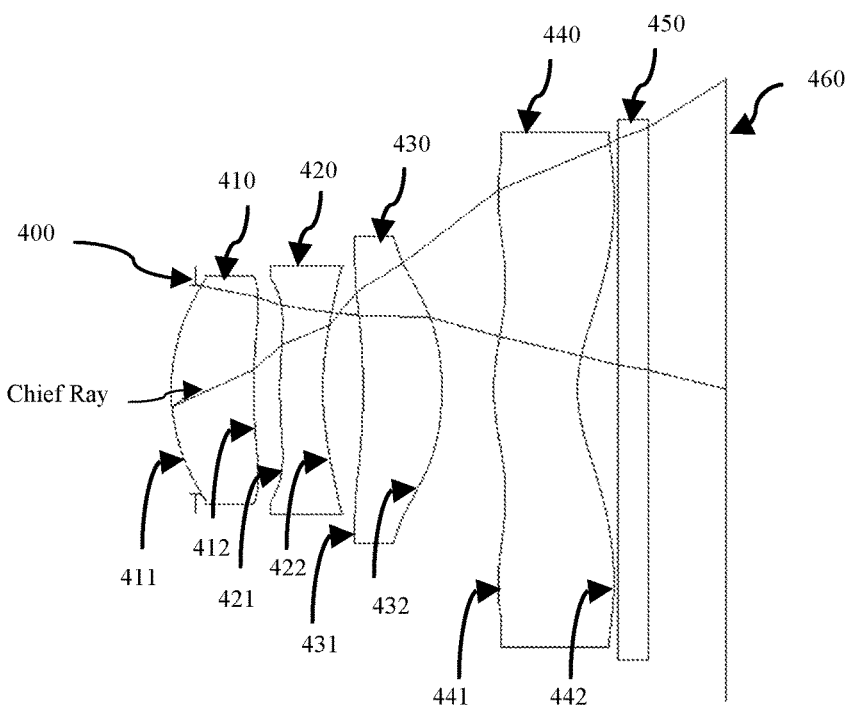
FIG. 10 shows a lens assembly in accordance with a fourth embodiment for the disclosure.

Referring to FIG. 10 for the fourth embodiment of the present invention, the lens assembly sequentially arranged from an object-side to an image-side along the optical axis, comprises an aperture stop 400, a first lens element 410, a second lens element 420, a third lens element 430, a fourth lens element 440, an IR-cut filter 450 and an image plane 460, wherein all the lens elements 410, 420, 430 and 440 are made of plastic.

The first lens element 410 with positive refractive power has a convex object-side surface 411 and an image-side surface 412;

The second lens element 420 with negative refractive power has a concave image-side surface 422 and an object-side surface being concave in a peripheral region;

The third lens element 430 with negative refractive power has a concave object-side surface 431 and a convex image-side surface 432;

The fourth lens element 440 with positive refractive power has an object-side surface 441, which contains multiple inflection points in a paraxial region and a convex image-side surface 442 being concave in a paraxial region and convex in a peripheral region.

Figure 11:
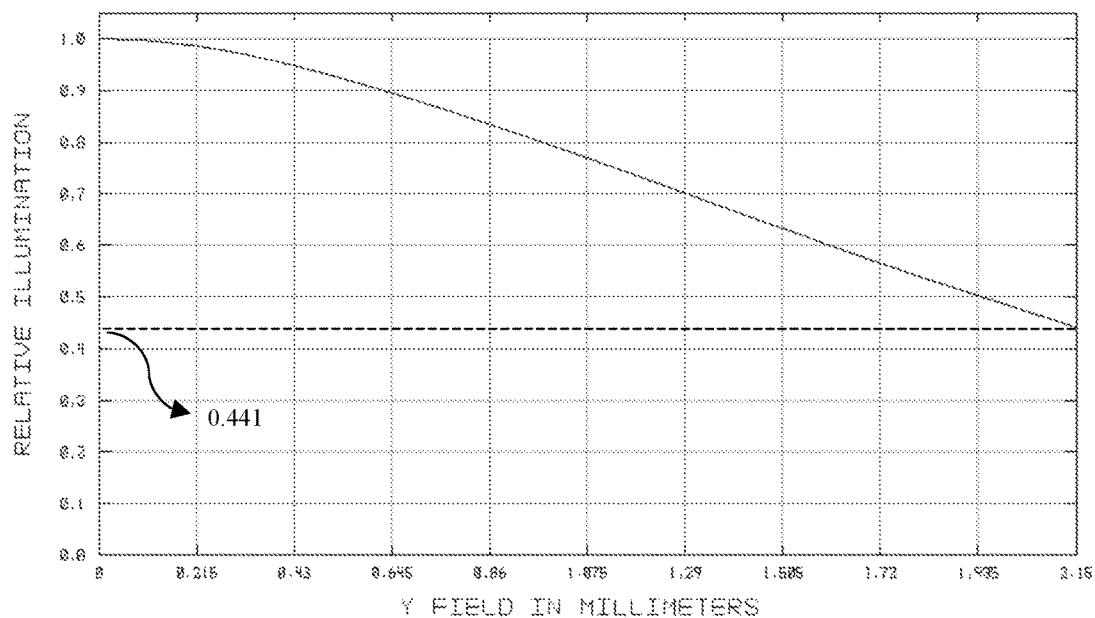
FIG. 11 shows the RI curve of the fourth embodiment for the disclosure.
Figure 12:
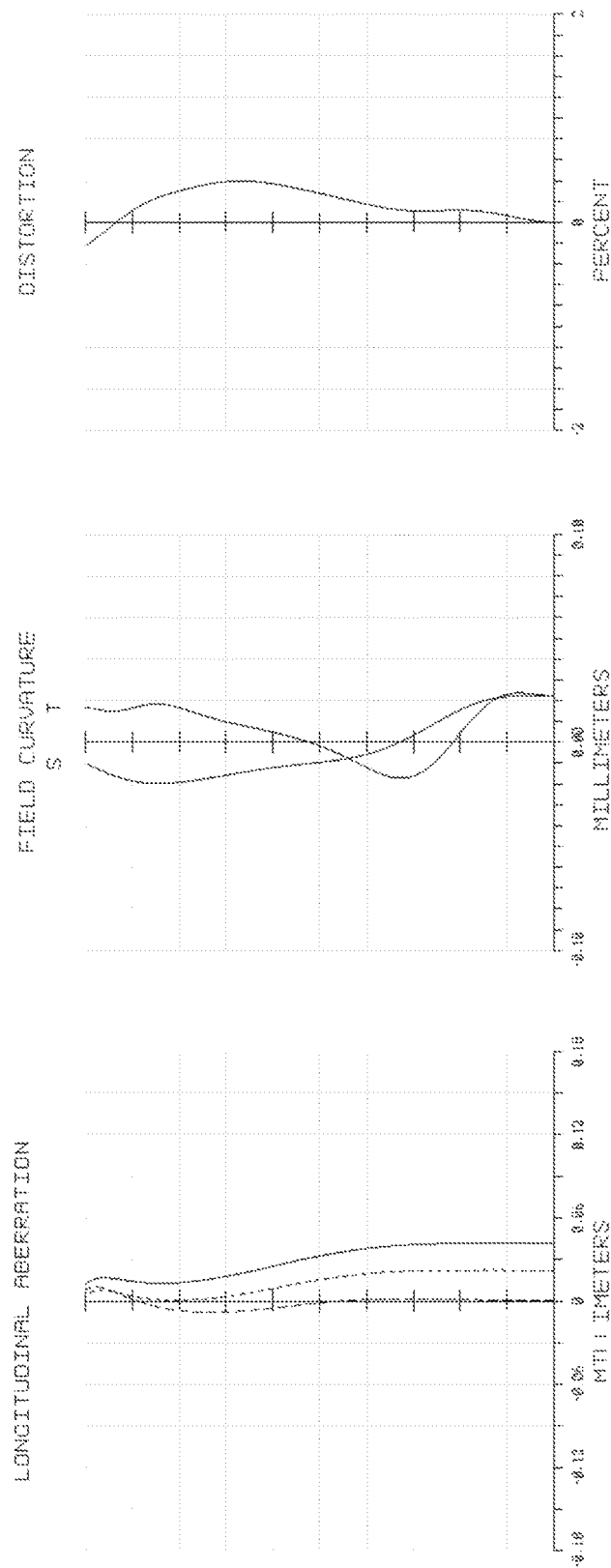
FIG. 12 shows the aberration curves of the fourth embodiment for the disclosure.

What is revealed in FIG. 11 is the relative illumination status of the fourth embodiment wherein the Y axis is the value of relative illumination and the X axis is the image heights corresponding to fields counted from 0 to 1 field. It can be seen a decreased relative illumination curve in FIG. 11. We pick up the lowest point of the relative illumination curve as the minimum illumination value $RI_{min}$. In this embodiment, $RI_{min}$ is 0.441 at the maximum image height, which means the system has good imaging illumination uniformity.

The detailed information of lens assembly in the fourth embodiment is shown in TABLE 4-1 and 4-2 below.

TABLE 4-1

Embodiment 4
f = 3.05, F# = 2.05, HFOV = 35.76°,

| Surface No. | Curvature radius (mm) | Thickness (mm) | Refractive Index (Nd) | Dispersion coefficient (Vd) |
|---|---|---|---|---|
| Aperture stop | ~ | ~ | -0.170 | |
| First lens element | 411 | 1.34 | 0.569 | 1.544 | 55.9 |
| | 412 | 3.13 | 0.183 | | |
| Second lens element | 421 | 2.85 | 0.296 | 1.636 | 23.3 |
| | 422 | 1.91 | 0.28 | | |
| Third lens element | 431 | -5.06 | 0.546 | 1.636 | 23.3 |
| | 432 | -2.05 | 0.363 | | |
| Fourth lens element | 441 | 1.26 | 0.58 | 1.544 | 55.9 |
| | 442 | 0.956 | 0.28 | | |
| IR-cut filter | 451 | ~ | 0.21 | 1.517 | 64.2 |
| | 452 | ~ | 0.538 | | |
| Image plane | 460 | ~ | ~ | ~ | ~ |

TABLE 4-2

Aspheric Coefficients

| Sur. No. | 411 | 412 | 421 | 422 |
|---|---|---|---|---|
| k | -4.125 | -11.2 | -49.01 | -26.5 |
| A4 | 2.169E-01 | -1.016E-01 | -7.017E-02 | 3.096E-01 |
| A6 | -1.638E-01 | -4.465E-02 | -1.034E+00 | -1.344E+00 |
| A8 | 5.402E-01 | -3.372E-01 | 2.352E+00 | 3.372E+00 |
| A10 | -2.006E+00 | 4.855E-01 | -5.792E+00 | -6.213E+00 |
| A12 | 4.516E+00 | -7.704E-01 | 8.320E+00 | 8.166E+00 |
| A14 | -5.288E+00 | 3.653E-01 | -5.262E+00 | -6.437E+00 |
| A16 | 2.285E+00 | 2.097E-02 | 1.197E+00 | 2.328E+00 |
| A18 | -2.698E-01 | 6.316E-01 | 9.410E-01 | -5.369E-03 |

| Sur. No. | 431 | 432 | 441 | 442 |
|---|---|---|---|---|
| k | 27.28 | -49.80 | 5.52 | -1.08 |
| A4 | -7.446E-02 | -1.194E+00 | -4.291E-01 | -5.575E-01 |
| A6 | 4.753E-01 | 3.877E+00 | 3.191E-01 | 4.872E-01 |
| A8 | -1.288E+00 | -1.114E+01 | -1.180E-01 | -3.373E-01 |
| A10 | 2.596E+00 | 2.467E+01 | 2.617E-02 | 1.722E-01 |
| A12 | -5.363E-01 | -3.872E+01 | -3.598E-03 | -6.170E-02 |
| A14 | -6.974E+00 | 4.150E+01 | 3.053E-04 | 1.488E-02 |
| A16 | 1.255E+01 | -2.829E+01 | -1.552E-05 | -2.279E-03 |
| A18 | -9.294E+00 | 1.087E+01 | 4.328E-07 | 1.992E-04 |

Figure 13:
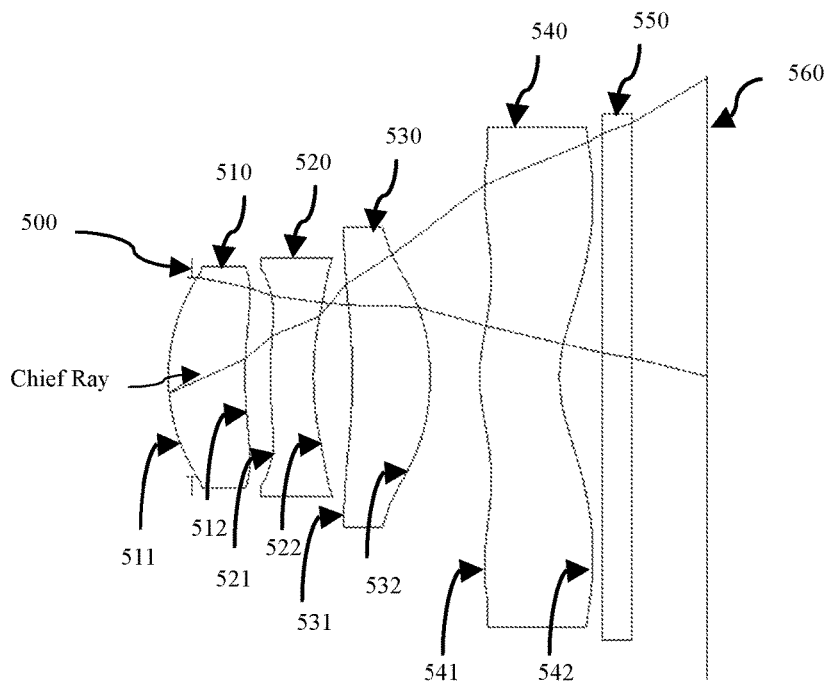
FIG. 13 shows a lens assembly in accordance with a fifth embodiment for the disclosure.

Referring to FIG. 13 for the fifth embodiment of the present invention, the lens assembly sequentially arranged from an object-side to an image-side along the optical axis, comprises an aperture stop 500, a first lens element 510, a second lens element 520, a third lens element 530, a fourth lens element 540, an IR-cut filter 550 and an image plane 560, wherein all the lens elements 510, 520, 530 and 540 are made of plastic.

The first lens element 510 with positive refractive power has a convex image-side surface 511 and an image-side surface 512;

The second lens element 520 with negative refractive power has a concave image-side surface 522 and an object-side surface being concave in a peripheral region;

The third lens element 530 with negative refractive power has a concave object-side surface 531 and a convex image-side surface 532;

The fourth lens element 540 with positive refractive power has an object-side surface 541, which contains multiple inflection points in a paraxial region, and a convex image-side surface 542 being concave in a paraxial region and convex in a peripheral region.

Figure 14:
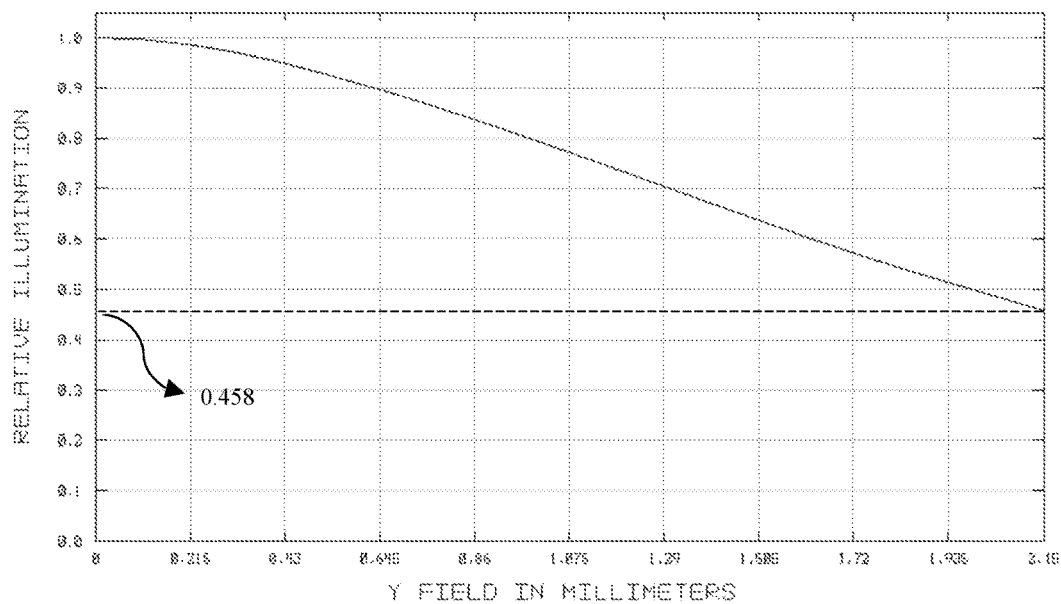
FIG. 14 shows the RI curve of the fifth embodiment for the disclosure.
Figure 15:
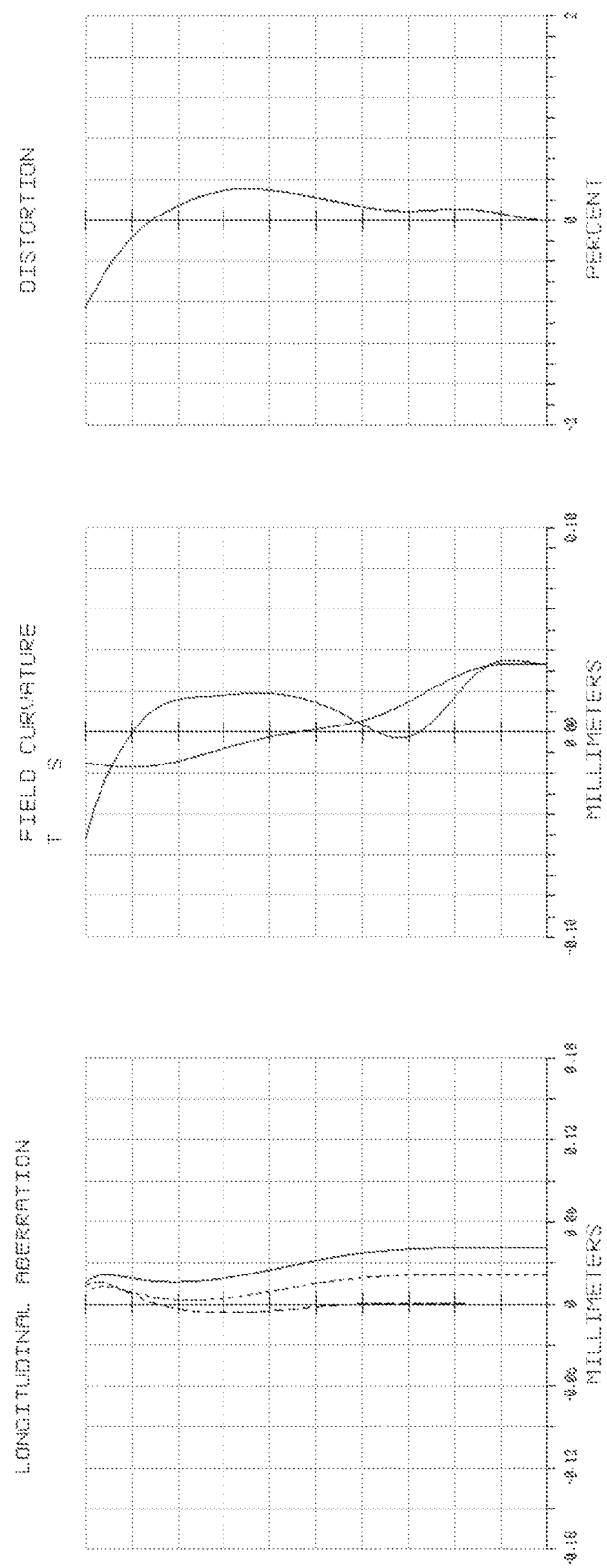
FIG. 15 shows the aberration curves of the fifth embodiment for the disclosure.

What is revealed in FIG. 14 is the relative illumination status of the fourth embodiment wherein the Y axis is the value of relative illumination and the X axis is the image heights corresponding to fields counted from 0 to 1 field. It can be seen a decreased relative illumination curve in FIG. 14. We pick up the lowest point of the relative illumination curve as the minimum illumination value $RI_{min}$. In this embodiment, $RI_{min}$ is 0.458 at the maximum image height, which means the system has good imaging illumination uniformity.

The detailed information of lens assembly in the fifth embodiment is shown in TABLE 5-1 and 5-2 below.

TABLE 5-1

Embodiment 5
f = 3.04, F# = 2.05, HFOV = 35.87°,

| Surface No. | Curvature radius (mm) | Thickness (mm) | Refractive Index (Nd) | Dispersion coefficient (Vd) |
|---|---|---|---|---|
| Aperture stop | ~ | −0.170 | | |
| First lens element | 511 | 1.35 | 0.551 | 1.544 | 55.9 |
| | 512 | 3.1 | 0.181 | | |
| Second lens element | 521 | 2.85 | 0.308 | 1.636 | 23.3 |
| | 522 | 1.91 | 0.279 | | |
| Third lens element | 531 | −5.1 | 0.556 | 1.636 | 23.3 |
| | 532 | −2.04 | 0.363 | | |
| Fourth lens element | 541 | 1.25 | 0.571 | 1.544 | 55.9 |
| | 542 | 0.971 | 0.31 | | |
| IR-cut filter | 551 | ~ | 0.21 | 1.517 | 64.2 |
| | 552 | ~ | 0.538 | | |
| Image plane | 560 | ~ | ~ | ~ | ~ |

TABLE 5-2

Aspheric Coefficients

| Sur. No. | 511 | 512 | 521 | 522 |
|---|---|---|---|---|
| k | −4.125 | −11.2 | −49.01 | −26.5 |
| A4 | 2.169E−01 | −1.016E−01 | −7.017E−02 | 3.096E−01 |
| A6 | −1.638E−01 | −4.465E−02 | −1.034E+00 | −1.344E+00 |
| A8 | 5.402E−01 | −3.372E−01 | 2.352E+00 | 3.372E+00 |
| A10 | −2.006E+00 | 4.855E−01 | −5.792E+00 | −6.213E+00 |
| A12 | 4.516E+00 | −7.704E−01 | 8.320E+00 | 8.166E+00 |
| A14 | −5.288E+00 | 3.653E−01 | −5.262E+00 | −6.437E+00 |
| A16 | 2.285E+00 | 2.097E−02 | 1.197E+00 | 2.328E+00 |
| A18 | −2.698E−01 | 6.316E−01 | 0.000E+00 | −5.369E−03 |

TABLE 5-2-continued

Aspheric Coefficients

| Sur. No. | 531 | 532 | 541 | 542 |
|---|---|---|---|---|
| k | 27.28 | −49.80 | 5.52 | −1.08 |
| A4 | −7.446E−02 | −1.194E+00 | −4.291E−01 | −5.575E−01 |
| A6 | 4.753E−01 | 3.877E+00 | 3.191E−01 | 4.872E−01 |
| A8 | −1.288E+00 | −1.114E+01 | −1.180E−01 | −3.373E−01 |
| A10 | 2.596E+00 | 2.467E+01 | 2.617E−02 | 1.722E−01 |
| A12 | −5.363E−01 | −3.872E+01 | −3.598E−03 | −6.170E−02 |
| A14 | −6.974E+00 | 4.150E+01 | 3.053E−04 | 1.488E−02 |
| A16 | 1.255E+01 | −2.829E+01 | −1.552E−05 | −2.279E−03 |
| A18 | −9.294E+00 | 1.087E+01 | 4.328E−07 | 1.992E−04 |

The detailed information of lens assembly in all presented embodiment is shown in TABLE 6 below.

In TABLE 6, TTL is the total track length and BFL is the back focal length, AC3 represents the total aspheric coefficients of said object-side surface in 2nd lens element, AC4 represents the total aspheric coefficients of said image-side surface in 2nd lens element, ASUM represents the total aspheric coefficients of all surfaces in said lens assembly, R5 is the curvature radius of the object-side surface of said third lens element and R6 is the curvature radius of the image-side surface of said third lens element, T represents the total center thickness of four lens elements, AT represents the total center air thickness counted from the first lens element to the IR-cut filter, HFOV represents the half field of view of said lens assembly, $RI_{min}$ represents the minimum relative illumination of effective field.

TABLE 6

| Embodiment | 1 | 2 | 3 | 4 | 5 |
|---|---|---|---|---|---|
| F# | 2.05 | 2.05 | 2.05 | 2.05 | 2.05 |
| BFL | 0.485 | 0.578 | 0.580 | 0.579 | 0.579 |
| TTL | 3.98 | 3.83 | 3.84 | 3.84 | 3.87 |
| TTL/BFL | 8.21 | 6.63 | 6.62 | 6.63 | 6.68 |
| AC3 | −0.299 | −0.288 | −0.288 | 0.653 | −0.288 |
| AC4 | 0.101 | 0.182 | 0.182 | 0.177 | 0.177 |
| ASUM | −1.768 | −1.855 | −1.855 | −0.558 | −1.499 |
| R5/R6 | 2.63 | 2.48 | 2.48 | 2.47 | 2.50 |
| T/AT | 2.35 | 2.82 | 2.80 | 2.80 | 2.75 |
| HFOV | 33.67° | 35.88° | 35.76° | 35.76° | 35.87° |
| $RI_{min}$ | 0.58 | 0.431 | 0.438 | 0.441 | 0.458 |

What is claimed is:

1. A lens assembly for portable devices, in order from an object-side to an image-side along an optical axis, comprising:
   an aperture stop;
   a plastic first lens element with positive refractive power having a convex object-side surface;
   a plastic second lens element with negative refractive power having a concave image-side surface and an object-side surface being concave in a peripheral region;
   a plastic third lens element with negative refractive power having a concave object-side surface and a convex image-side surface;
   a plastic fourth lens element with positive refractive power having an image-side surface being concave in a paraxial region and convex in a peripheral region; and
   an IR-cut filter (infrared-cut filter);
   wherein $RI_{min}$ represents a minimum relative illumination of effective field and $RI_{min}$ satisfies the following relation:

$$0.36 < RI_{min} < 0.65.$$

2. The lens assembly for portable devices according to claim 1, wherein HFOV represents the half field of view of said lens assembly, and it satisfies the following relation:

$$HFOV \geq 33.67.$$

3. The lens assembly for portable devices according to claim 2, wherein R5 is a curvature radius of the object-side surface of said third lens element and R6 is a curvature radius of the image-side surface of said third lens element, and R5 and R6 satisfy the following relation:

$$R5/R6 \geq 2.47.$$

4. The lens assembly for portable devices according to claim 3, wherein T represents the total center thickness of four lens elements, AT represents the total center air thickness counted from the first lens element to the IR-cut filter, and they satisfy the following relation:

$$T/AT \geq 2.35.$$

5. The lens assembly for portable devices according to claim 4, wherein AC3 represents the total aspheric coefficients of said object-side surface in 2nd lens element, and it satisfies the following relation:

$$-0.299 \leq AC3 \leq 0.653.$$

6. The lens assembly for portable devices according to claim 4, wherein AC4 represents the total aspheric coefficients of said image-side surface in 2nd lens element, and it satisfies the following relation:

$$0.101 \leq AC4 \leq 0.182.$$

7. The lens assembly for portable devices according to claim 4, wherein ASUM represents the total aspheric coefficients of all surfaces in said lens assembly and it satisfies the following relation:

$$-1.855 \leq ASUM \leq -0.558.$$

8. The lens assembly for portable devices according to claim 4, wherein TTL is the total track length and BFL is the back focal length of said lens assembly, and they satisfy the following relation:

$$6.62 \leq TTL/BFL \leq 8.21.$$

* * * * *